(12) United States Patent
Otaka et al.

(10) Patent No.: US 7,709,554 B2
(45) Date of Patent: May 4, 2010

(54) RESIN COMPOSITION, RESIN CURED PRODUCT, AND LIQUID DISCHARGE HEAD

(75) Inventors: Shimpei Otaka, Yokohama (JP); Kazunari Ishizuka, Suntoh-gun (JP); Isamu Horiuchi, Kawasaki (JP); Isao Imamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 11/600,021

(22) Filed: Nov. 16, 2006

(65) Prior Publication Data
US 2007/0142491 A1    Jun. 21, 2007

(30) Foreign Application Priority Data
Dec. 16, 2005    (JP) ............................. 2005-363453

(51) Int. Cl.
C08F 2/50    (2006.01)
C08F 2/46    (2006.01)
C08J 3/28    (2006.01)

(52) U.S. Cl. ......................... 522/170; 522/25; 522/31; 522/109; 522/111; 522/168; 522/178; 522/181; 525/90; 525/96; 525/97

(58) Field of Classification Search ................ 522/25, 522/109, 170, 168, 111, 178, 181; 528/90, 528/96, 97; 428/411.1, 412, 414
See application file for complete search history.

(56) References Cited

U.S. PATENT DOCUMENTS

| | | | |
|---|---|---|---|
| 4,820,549 A * | 4/1989 | Ozaki et al. | 427/98.5 |
| 5,151,471 A * | 9/1992 | Qureshi et al. | 525/423 |
| 5,335,004 A | 8/1994 | Matsuhisa | 347/44 |
| 5,524,784 A | 6/1996 | Shiba et al. | 216/27 |
| 5,663,752 A | 9/1997 | Imamura et al. | 347/65 |
| 5,738,911 A | 4/1998 | Imamura et al. | 427/387 |
| 5,770,271 A | 6/1998 | Imamura | 427/412.1 |
| 5,877,229 A * | 3/1999 | Janke et al. | 522/31 |
| 5,980,026 A | 11/1999 | Imamura et al. | 347/65 |
| 6,291,545 B2 | 9/2001 | Imamura | 522/181 |
| 6,409,931 B1 | 6/2002 | Shimomura et al. | 216/27 |
| 6,586,495 B1 | 7/2003 | Shimomura et al. | 522/112 |
| 6,713,128 B2 | 3/2004 | Shimomura et al. | 427/273 |
| 6,727,035 B2 * | 4/2004 | Yamamura et al. | 430/269 |
| 6,750,290 B2 | 6/2004 | Imamura et al. | 525/116 |
| 6,846,520 B2 | 1/2005 | Shimomura et al. | 427/510 |
| 6,869,541 B2 | 3/2005 | Shimomura et al. | 216/27 |
| 2004/0014317 A1 * | 1/2004 | Sakamoto et al. | 438/689 |
| 2004/0034161 A1 * | 2/2004 | Osada et al. | 524/588 |
| 2005/0054756 A1 * | 3/2005 | Kamayachi et al. | 524/115 |
| 2005/0133240 A1 * | 6/2005 | Hidaka et al. | 174/52.2 |

FOREIGN PATENT DOCUMENTS

JP    3-184868    8/1991

* cited by examiner

*Primary Examiner*—Sanza L McClendon
(74) *Attorney, Agent, or Firm*—Fitzpatrick, Cella, Harper & Scinto

(57) ABSTRACT

An epoxy resin composition, including: an epoxy resin (A) represented by Formula (1); an epoxy resin (B) having an epoxy equivalent of 220 or less and having twice or more epoxy groups in a molecule than epoxy groups of the epoxy resin (A); and a photocationic polymerization initiator (C), in which: the epoxy resins (A) and (B) constitute main components; and a weight of the epoxy resin (A) is 40% or more and a weight of the epoxy resin (B) is 30% or more with respect to a total weight of the epoxy resins (A) and (B):

Formula (1)

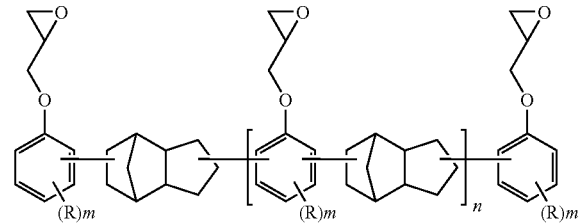

where: R represents a hydrogen atom, a methyl group, an ethyl group, a propyl group, or a t-butyl group; n represents an integer of 0 or more and 4 or less; and m represents an integer of 1 or more and 3 or less.

14 Claims, 6 Drawing Sheets

RESIN COMPOSITION, RESIN CURED PRODUCT, AND LIQUID DISCHARGE HEAD

BACKGROUND OF THE INVENTION

1. Field of the Invention

The present invention relates to a resin composition, a resin cured product and a liquid discharge head.

2. Related Background Art

An epoxy resin composition is capable of providing a cured product having excellent heat resistance, adhesiveness, electrical insulating properties, and the like, and thus is preferably used in applications such as a semiconductor sealer, a printed wiring board, paint, and a casting material. Of those, in electrical and electronic applications requiring particularly high reliability, use of an epoxy resin (hereinafter, referred to as an epoxy resin (A)) represented by Formula (1) described below and having a dicyclopentadiene skeleton is proposed. The epoxy resin (A) has a bulky cyclic aliphatic hydrocarbon skeleton in a molecule and thus has properties of low water absorption property and low dielectric constant:

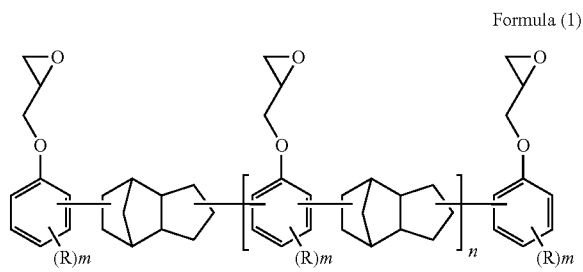

Formula (1)

where: R represents a hydrogen atom, a methyl group, an ethyl group, a propyl group, or a t-butyl group; n represents an integer of 0 to 4; and m represents an integer of 1 to 3.

Meanwhile, a photocuring technique involving cationic ring opening polymerization of an epoxy resin with a cationic UV-curable initiator (photocationic polymerization initiator) is in practical use in wide ranging fields such as coating agent, ink, a resist for producing a semiconductor, and a stereo lithography resin.

In recent years, there is known a method of producing a liquid discharge head for forming a liquid passage by applying the photocuring technique and subjecting a photocationic curable resin layer laminated on a substrate to photolithography techniques such as exposure and development. For example, Japanese Patent Application Laid-Open No. H03-184868 discloses a method of forming a liquid passage by subjecting an epoxy resin having a bisphenol-A, F, or S skeleton or an o-cresol novolac-type epoxy resin to photocationic polymerization.

A known application example of the liquid discharge head is an ink jet recording head in which the head is loaded in a recording device. At present, a commercially available ink jet recording head has a high ink jet port density of 600 dpi and requires a technique of producing a fine ink passage.

Therefore, the method of forming a passage for an ink jet recording head applying photolithography techniques and described above is better than conventionally known methods employing plating and laser processing in view of precision in forming a desired passage and discharge port pattern.

Meanwhile, a passage wall forming member of an ink jet recording head is constantly in contact with ink during use of a product. Generally used ink is often alkaline and contains an organic solvent. Low water absorption property and excellent solvent resistance are strongly desired for the passage wall forming member constantly in contact with such a substance. In the case where the passage wall forming member has no such properties, the passage wall forming member undergoes volume swelling and the passage or the discharge port deforms. Thus, a desired discharge state may not be obtained, and the passage wall forming member may peel off from the substrate.

SUMMARY OF THE INVENTION

The inventors of the present invention have studied forming a fine pattern on an epoxy resin (A) having excellent properties of low absorption property as described above through photolithography, and applying the fine pattern to a passage wall forming member of an ink jet recording head.

As described below, the inventors of the present invention have formed a pattern by dissolving an epoxy resin (A) containing a photocationic polymerization initiator added in a solvent, forming an applied film on a substrate, and conducting exposure and development, and have evaluated a cured product obtained through curing.

As a result, the obtained cured product had sufficient properties from a viewpoint of low absorption property applicable to a current environment employing the cured product as an ink jet recording head, that is, an environment in which the cured product is in contact with ink for a long period of time.

However, no precise pattern satisfying properties currently required for the passage wall forming member of the ink jet recording head was obtained. To be specific, for pattern formation on the epoxy resin (A) through photolithography, pattern formation was conducted with an exposure providing desired pattern dimensions, and a pattern edge part became blunt. Further, in pattern formation with an exposure suppressing blunting of the pattern edge part, partial peeling of the resin was caused during development because of insufficient curing of the resin. This phenomenon was probably caused by low polymerization reactivity of the epoxy resin having a dicyclopentadiene skeleton due to a small number of functional groups.

The inventors of the present invention have conducted intensive studies for solving the problems described above, and have found a composition satisfying low water absorption property and high polymerization reactivity at the same time.

The present invention relates to an epoxy resin composition, including: an epoxy resin (A) represented by Formula (1); an epoxy resin (B) having an epoxy equivalent of 220 or less and having twice or more epoxy groups in a molecule than epoxy groups of the epoxy resin (A); and a photocationic polymerization initiator (C), in which: the epoxy resins (A) and (B) constitute main components; and a weight of the epoxy resin (A) is 40% or more and a weight of the epoxy resin (B) is 30% or more with respect to a total weight of the epoxy resins (A) and (B).

Further, the present invention relates to a liquid discharge head, including: an energy generating element for generating energy to be used for discharge of a liquid; a discharge port for discharging the liquid; and a passage for supplying the liquid to the discharge port, in which: the discharge port and the passage are each formed of a photosensitive resin. The photosensitive resin is formed of the epoxy resin composition including: an epoxy resin (A) represented by Formula (1); an epoxy resin (B) having an epoxy equivalent of 220 or less and having twice or more epoxy groups in a molecule than epoxy groups of the epoxy resin (A); and a photocationic polymerization initiator (C), in which: the epoxy resins (A) and (B) constitute main components of the photosensitive resin; and a weight of the epoxy resin (A) is 40% or more and a weight of the epoxy resin (B) is 30% or more with respect to a total weight of the epoxy resins (A) and (B).

Further, the present invention relates to a method of producing a liquid discharge head, including the steps of: laminating a photosensitive resin on a substrate having an energy generating element for generating energy to be used for discharge of a liquid; and forming a discharge port for discharging a liquid through exposure and development of the photosensitive resin and a liquid passage for supplying the liquid to the discharge port, in which the photosensitive resin is formed of an epoxy resin composition including: an epoxy resin (A) represented by Formula (1); an epoxy resin (B) having an epoxy equivalent of 220 or less and having twice or more epoxy groups in a molecule than epoxy groups of the epoxy resin (A); and a photocationic polymerization initiator (C), in which: epoxy resins (A) and (B) constitute main components of the epoxy resin composition; and a weight of the epoxy resin (A) is 40% or more and a weight of the epoxy resin (B) is 30% or more with respect to a total weight of the epoxy resins (A) and (B).

That is, the present invention is capable of solving the above-mentioned problems by adding to the epoxy resin (A), an epoxy resin having high polymerization reactivity providing a final cured product with a high crosslinking density and capable of maintaining low water absorption property of the epoxy resin (A).

As described above, the photocationic polymerizable epoxy resin of the present invention can realize an epoxy resin having both polymerization reactivity and low water absorption property of a cured product by mixing a highly reactive epoxy resin with the epoxy resin (A) having a dicyclopentadiene skeleton. The epoxy resin composition of the present invention allows formation of a fine pattern through photocationic polymerization, and a cured product thereof has low water absorption property due to the dicyclopentadiene skeleton, a high crosslinking density due to polymerization reactivity provided, low swelling property, and high mechanical strength.

Thus, the epoxy resin composition of the present invention is used in an environment in which the epoxy resin composition is constantly in contact with a liquid as an ink jet recording head, and can sufficiently be applied in fields requiring a fine line and space pattern in a several µm order.

Further, the epoxy resin composition of the present invention can be applied in fields of microprocessing such as a micromachine.

Further features of the present invention will become apparent from the following description of exemplary embodiments with reference to the attached drawings.

DESCRIPTION OF THE EMBODIMENTS

Figure 1:
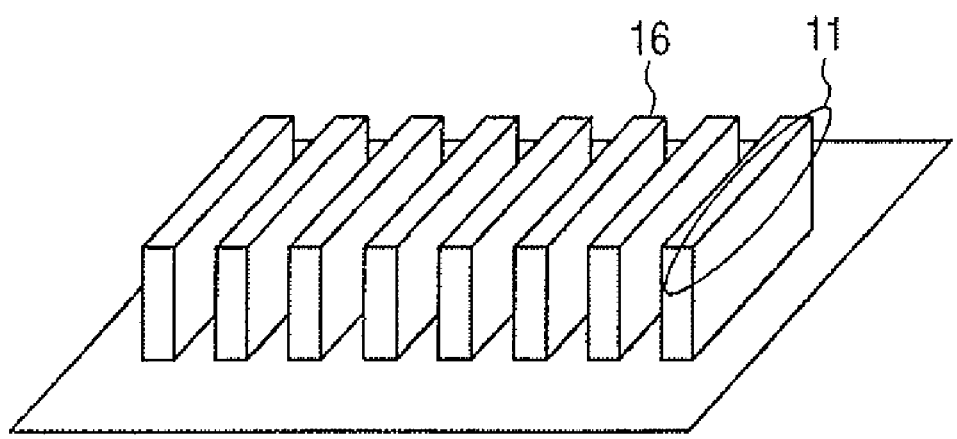
FIG. 1 is a stereoscopic perspective view of a cured product of an epoxy resin composition of each of Examples of the present invention used for Evaluation 1.

Specific examples of an epoxy resin (A) of the present invention represented by Formula (1) and having a dicyclopentadiene skeleton include compounds represented by Formulae (7) and (8) described below:

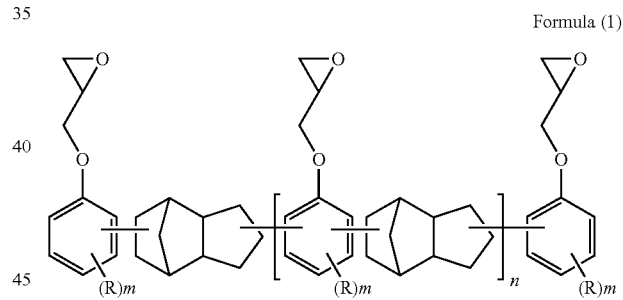

Formula (1)

where: R represents a hydrogen atom, a methyl group, an ethyl group, a propyl group, or a t-butyl group; n represents an integer of 0 to 4; and m represents an integer of 1 to 3.

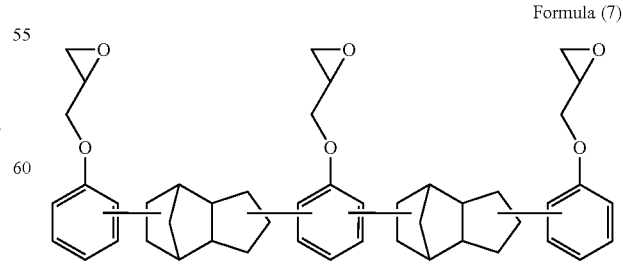

Formula (7)

Formula (8)

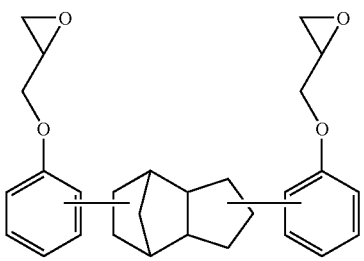

Such an epoxy resin can be produced through a glycidylation reaction of a polymer of phenol and dicyclopentadiene with epichlorohydrin or the like. Commercially available examples thereof include HP-7200 series, available from Dainippon Ink and Chemicals, Inc. Such epoxy resins each having an epoxy equivalent of 245 to 280 are known.

The epoxy resin composition of the present invention includes as main components: an epoxy resin represented by Formula (1) as an epoxy resin (A); and an epoxy resin having an epoxy equivalent of 220 or less and having twice or more epoxy groups in a molecule than epoxy groups of the epoxy resin (A) as an epoxy resin (B). The main components used herein refer to components accounting for 50 wt % or more of a total weight of the epoxy resin composition.

The epoxy resin (B) is introduced for enhancing cationic polymerization reactivity of an entire resin. The inventors of the present invention have found that the number of functional groups of the epoxy resin (B) is important for obtaining the above-mentioned effects. That is, the above-mentioned effects can be obtained by increasing the number of active sites contributing to a polymerization reaction. As a result of detailed studies, the inventors of the present invention have found that significant effects can be obtained in the case where the epoxy resin (B) has twice or more epoxy groups in a molecule than epoxy groups of the epoxy resin (A).

However, property of having a large number of functional groups in a molecule alone can be realized with an epoxy resin having a large molecular weight and a bulky main chain, and having many repeating units. However, use of such a resin provides insufficient number of functional groups per molecular weight even though the molecular weight of the entire resin composition is high, and thus a cured product may not have a sufficient crosslinking density.

The inventors of the present invention have studied and found that the epoxy resin (B) must have a sufficiently small number of epoxy groups with respect to the total molecular weight, that is, epoxy equivalent of the epoxy resin (B) compared with that of the epoxy resin (A). To be specific, the inventors of the present invention have found that the epoxy equivalent of the epoxy resin (B) is preferably 220 or less.

A preferred example of such an epoxy resin is a polyfunctional epoxy resin represented by Formula (2) and having an oxycyclohexane structure. Such a resin having an epoxy equivalent of about 150 to 200 is known:

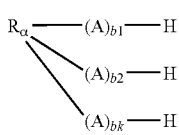

Formula (2)

where: $R_\alpha$ represents a k-valent organic compound residue; b1, b2, bk, and so on are each an integer of 1 or more and 100 or less, and a sum of b1, b2, bk, and so on is no more than 100; k represents an integer of 1 or more and 100 or less; A represents an oxycyclohexane skeleton represented by Formula (3) or (4) described below: where, X represents an epoxy group.

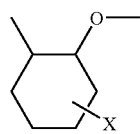

Formula (3)

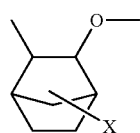

Formula (4)

Further, an epoxy resin represented by Formula (5) may preferably be used.

A specific example of such an epoxy resin is a compound represented by Formula (9). Such an epoxy resin having an epoxy equivalent of about 215 is known:

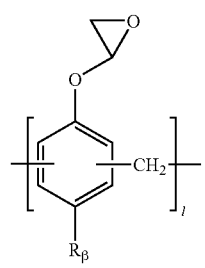

Formula (5)

where: $R_\beta$ represents a hydrocarbon compound having an epoxy group; and l represents a natural number.

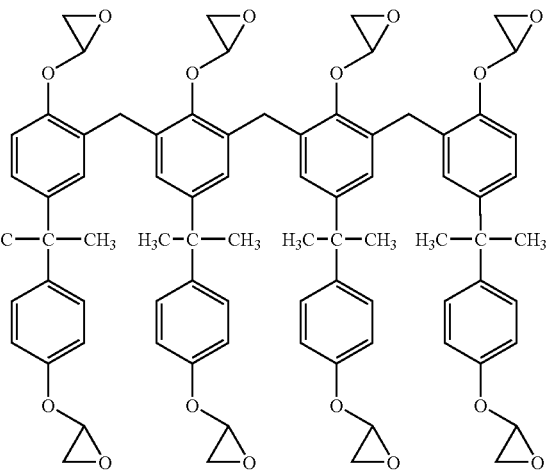

Formula (9)

Such an epoxy resin has a large number of epoxy groups per the molecular weight and thus has high cationic polymerization reactivity. Introduction of such an epoxy resin can increase polymerization reactivity of the entire resin composition and enhance a crosslinking density of a cured product.

Examples of the epoxy resin having the above-mentioned properties include: EPON SU-8, which is a polyfunctional novolac-type epoxy resin available from Shell Chemicals, Ltd.; and EHPE 3150, which is a polyfunctional alicyclic epoxy resin available from Daicel Chemical Industries, Ltd. In order to exhibit properties of the two epoxy resins fully, the weight of the epoxy resin (A) must be 40% or more and the weight of the epoxy resin (B) must be 30% or more with respect to the total weight of the epoxy resin (A) and the epoxy resin (B).

Another constituent feature of the epoxy resin composition of the present invention is a cationic polymerization initiator (C) such as an aromatic iodonium salt or an aromatic sulfonium salt. Examples of so-called aromatic onium salts include: SP-150, SP-170, and SP-172 (trade names) available from Adeka Corporation; and Rhodorsil 2074 (trade name) available from Rhodia Silicones.

Such a photocationic polymerization initiator is capable of generating cations under UV irradiation and starting polymerization. The photocationic polymerization initiator is preferably used in an amount of 0.5 to 10 mass % with respect to 100 mass % of the epoxy resin components in the resin composition.

Further, the resin composition may contain additives and the like added arbitrary as required. For example, a flexibilizer may be added for reducing modulus of a cured product, or a silane coupling agent may be added for providing enhanced adhesion with a substrate. An addition amount thereof may arbitrarily be set to an amount sufficient for developing a target effect.

EXAMPLES

Hereinafter, the present invention will be described specifically by way of examples, comparative examples, and production examples. However, the present invention is not limited to the examples. The obtained epoxy resin composition was evaluated by the following tests. Note that the term "parts" used in the examples and the comparative examples refer to "parts by weight" and "wt %" with respect to the total weight of the epoxy resin composition.

In the following description, components having the same function are represented by the same number in figures, and description of the component may be omitted.

(Evaluation 1)

The inventors of the present invention have conducted evaluation of patterning property by forming the following epoxy resin composition layers of Examples and Comparative Examples on substrates, and conducting exposure and development.

Example 1

An epoxy resin composition of Example 1 of the present invention consists of the following compositions.

| | |
|---|---|
| Epoxy resin (A): HP-7200H (manufactured by Dainippon Ink and Chemicals, Inc.) | 66.5 parts |
| Epoxy resin (B): EHPE 3150 (epoxy equivalent of about 180) (manufactured by Daicel Chemical Industries, Ltd.) | 28.5 parts |

-continued

| | |
|---|---|
| Photocationic polymerization initiator: SP-172 (manufactured by Adeka Corporation) | 1.5 parts |
| Additive (silane coupling agent): A-187 (manufactured by Nihonunika Corporation) | 3.5 parts |

The epoxy resin composition of Example 1 was dissolved in methyl isobutyl ketone to obtain an epoxy resin solution. In addition, the epoxy resin compositions of Examples 2 to 4 and Comparative Examples 1 and 2 described below were each performed in the same manner as Example 1 to obtain an epoxy resin solution.

Example 2

| | |
|---|---|
| Epoxy resin (A): HP-7200 (manufactured by Dainippon Ink and Chemicals, Inc.) | 66.5 parts |
| Epoxy resin (B): EHPE 3150 (manufactured by Daicel Chemical Industries, Ltd.) | 28.5 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Example 3

| | |
|---|---|
| Epoxy resin (A): HP-7200H (manufactured by Dainippon Ink and Chemicals, Inc.) | 57 parts |
| Epoxy resin (B): EHPE 3150 (manufactured by Daicel Chemical Industries, Ltd.) | 38 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Example 4

| | |
|---|---|
| Epoxy resin (A): HP-7200 (manufactured by Dainippon Ink and Chemicals, Inc.) | 57 parts |
| Epoxy resin (B): EHPE 3150 (manufactured by Daicel Chemical Industries, Ltd.) | 38 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Example 5

| | |
|---|---|
| Epoxy resin (A): HP-7200H (manufactured by Dainippon Ink and Chemicals, Inc.) | 47.5 parts |
| Epoxy resin (B): EHPE 3150 (manufactured by Daicel Chemical Industries, Ltd.) | 47.5 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Example 6

| | |
|---|---|
| Epoxy resin (A): HP-7200 (manufactured by Dainippon Ink and Chemicals, Inc.) | 47.5 parts |
| Epoxy resin (B): EHPE 3150 (manufactured by Daicel Chemical Industries, Ltd.) | 47.5 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Example 7

| | |
|---|---|
| Epoxy resin (A): HP-7200H (manufactured by Dainippon Ink and Chemicals, Inc.) | 38 parts |
| Epoxy resin (B): EHPE 3150 (manufactured by Daicel Chemical Industries, Ltd.) | 57 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Example 8

| | |
|---|---|
| Epoxy resin (A): HP-7200 (manufactured by Dainippon Ink and Chemicals, Inc.) | 38 parts |
| Epoxy resin (B): EHPE 3150 (manufactured by Daicel Chemical Industries, Ltd.) | 57 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Comparative Example 1

| | |
|---|---|
| Epoxy resin (A): HP-7200H (manufactured by Dainippon Ink and Chemicals, Inc.) | 95 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Comparative Example 2

| | |
|---|---|
| Epoxy resin (A): HP-7200 (manufactured by Dainippon Ink and Chemicals, Inc.) | 95 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Comparative Example 3

| | |
|---|---|
| Epoxy resin (A): HP-7200 (manufactured by Dainippon Ink and Chemicals, Inc.) | 85.5 parts |
| Epoxy resin (B): EHPE 3150 (manufactured by Daicel Chemical Industries, Ltd.) | 9.5 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Comparative Example 4

| | |
|---|---|
| Epoxy resin (A): HP-7200 (manufactured by Dainippon Ink and Chemicals, Inc.) | 85.5 parts |
| Epoxy resin (B): EHPE 3150 (manufactured by Daicel Chemical Industries, Ltd.) | 9.5 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Comparative Example 5

| | |
|---|---|
| Epoxy resin (A): HP-7200H (manufactured by Dainippon Ink and Chemicals, Inc.) | 76 parts |
| Epoxy resin (B): EHPE 3150 (manufactured by Daicel Chemical Industries, Ltd.) | 19 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Comparative Example 6

| | |
|---|---|
| Epoxy resin (A): HP-7200 (manufactured by Dainippon Ink and Chemicals, Inc.) | 76 parts |
| Epoxy resin (B): EHPE 3150 (manufactured by Daicel Chemical Industries, Ltd.) | 19 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

First, a 6-inch Si wafer was prepared as a substrate, and an $SiO_2$ layer having a thickness of 1.0 μm was formed through thermal oxidation. Next, an epoxy resin solution employing the epoxy resin composition of each of Examples 1 to 8 and Comparative Examples 1 and 6 was formed into a film on the substrate by a spin coating method, and the film was baked at 90° C. for 5 min for evaporation of an application solvent, to thereby obtain a resin composition layer having a thickness of 20 μm.

Then, the resin composition layer on the substrate was patterned (a line and space pattern of 50 μm in length and 10 μm in width) at an exposure of 1,000 mJ/cm² by using a mask aligner MPA600 (trade name) manufactured by Canon Inc.

After exposure, the resin composition layer was heated at 90° C. for 4 min on a hot plate, developed with a methyl isobutyl ketone/xylene mixed solvent, and cured through heat treatment at 200° C. for 1 hour for patterning.

Figure 2:
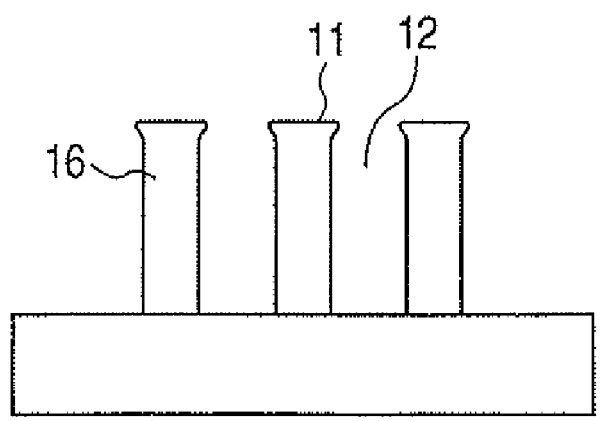
FIG. 2 is a schematic sectional view of a cured product of an epoxy resin composition of each of Comparative Examples of the present invention used for Evaluation 1.
Figure 3:
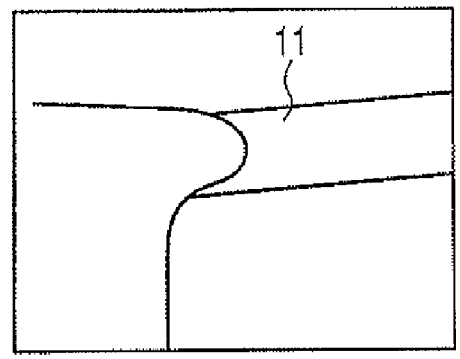
FIG. 3 is a perspective view of a cured product of the epoxy resin composition of each of Comparative Examples of the present invention used for Evaluation 1.

FIG. 1 is a stereoscopic perspective view of a pattern 16 employing the epoxy resin composition of each of Examples 1 to 8 used for Evaluation 1. FIG. 2 is a sectional view of a pattern employing the epoxy resin composition of each of Comparative Examples 1 and 6 used for Evaluation 1. FIG. 3 is an enlarged perspective view of a circled part of FIG. 2

As shown in FIG. 1, observation of the pattern after curing revealed that: the pattern employing the epoxy resin composition of each of Examples 1 to 8 had a sharp edge portion 11; and a line and space pattern satisfying a level to be applied to a passage forming member of an ink jet recording head was obtained. Reference numeral 12 represents a space in the pattern.

However, the pattern formed by using the epoxy resin composition of each of Comparative Examples 1 to 6 had a blunt edge part 11 as shown in FIG. 2. To be specific, as shown in FIG. 3, the edge part 11 was rounded and had a shape projecting to a space part compared with surrounding parts.

The observation of a line and space width revealed that: the cured products according to Examples of the present invention had substantially uniform dimensions; and the cured products according to Comparative Examples had varying space dimensions compared to those of Examples of the present invention. This phenomenon was probably caused by low photopolymerization reactivity of the resin A and a low crosslinking density of the pattern in a vicinity of the edge compared with those of other parts.

As described above, the results confirmed that fine photopatterning can be conducted with the resin composition having an amount ratio of the resin (A) to the resin (B) of(A):(B) =4:6 to 7:3, that is, the resin composition containing 30% or more of the resin (A) and 40% or more of the resin (B) with respect to the total amount of the resins (A) and (B).

(Evaluation 2)

Next, epoxy resin compositions according to the following examples are prepared.

Example 9

An epoxy resin composition of Example 9 of the present invention consists of the following compositions.

| | |
|---|---|
| Epoxy resin (A): HP-7200 (manufactured by Dainippon Ink and Chemicals, Inc.) | 28.5 parts |
| Epoxy resin (B): EHPE 3150 (epoxy equivalent of about 180) (manufactured by Daicel Chemical Industries, Ltd.) | 28.5 parts |
| Bis-phenol A type epoxy resin: EP-5100-75X (epoxy equivalent of about 630, manufactured by Adeka Corporation) | 38 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Example 10

An epoxy resin composition of Example 10 of the present invention consists of the following compositions.

| | |
|---|---|
| Epoxy resin (A): HP-7200 (manufactured by Dainippon Ink and Chemicals, Inc.) | 23.75 parts |
| Epoxy resin (B): EHPE 3150 (epoxy equivalent of about 180) (manufactured by Daicel Chemical Industries, Ltd.) | 23.75 parts |
| Bis-phenol A type epoxy resin: EP-5100-75X (epoxy equivalent of about 630, manufactured by Adeka Corporation) | 47.5 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

Comparative Example 7

An epoxy resin composition of Example 7 of the present invention consists of the following compositions.

| | |
|---|---|
| Epoxy resin (A): HP-7200 (manufactured by Dainippon Ink and Chemicals, Inc.) | 19 parts |
| Epoxy resin (B): EHPE 3150 (epoxy equivalent of about 180) (manufactured by Daicel Chemical Industries, Ltd.) | 19 parts |
| Bis-phenol A type epoxy resin: EP-5100-75X (epoxy equivalent of about 630, manufactured by Adeka Corporation) | 57 parts |
| Photocationic polymerization initiator: SP-172 (manufactured by Adeka Corporation) | 1.5 parts |
| Additive (silane coupling agent): A-187 (manufactured by Nihonunika Corporation) | 3.5 parts |

These examples and the resin compositions of examples 1 to 8 was dissolved in methyl isobutyl ketone and then a film of the resin composition is formed on the substrate by spin coating method, and the film was baked at 90° C. for 5 min for evaporation of an application solvent, to thereby obtain a resin composition layer having a thickness of 20 μm.

Then, a predetermined region of the resin composition layer was cured and patterned (a pattern in which two lines of a hole pattern having a diameter of 6 μm was formed at a 40 μm pitch on a pattern of 15 mm in length and 0.6 mm in width) by using a mask aligner MPA600 (trade name) manufactured by Canon Inc.

By Observing the produced patterns, in the pattern according to the resin composition of the comparative example 7, the entire edge portion of the cured resin is peeled from the substrate. On the contrary, in the patterns according to the epoxy resin compositions of examples 9 and 10, peeling was remarkably reduced and had durability for use as an ink jet recording head. This is because the epoxy resin composition of comparative example 7 has larger ratio of Bis-phenol A type epoxy resin having high epoxy equivalent as compared with the examples 9 and 10 and has less number of functional groups relating chemical adhesiveness.

In addition, in the patterns using the resin compositions according to examples 1 to 8 peeling from the substrate was not observed.

As mentioned above, according to the present invention, it is preferable that a ratio of the resin (A) and the resin (B) to whole weight of the epoxy resin composition is at least no less than 50 weight percent.

(Evaluation 3)

Patterning property of the epoxy resin composition of each of Examples 1 to 8, in which a favorable line and space pattern was obtained in Evaluation 1, was evaluated under conditions similar to those of a passage forming member of an ink jet recording head as a specific application example.

First, a 6-inch Si wafer was prepared as a substrate, and an $SiO_2$ layer having a thickness of 1.0 µm was formed through thermal oxidation.

Next, an epoxy resin solution containing the epoxy resin composition of each of Examples dissolved in methyl isobutyl ketone was formed into a film on the substrate by spin coating, and the film was baked at 90° C. for 5 min for evaporation of an application solvent, to thereby obtain a resin composition layer having a thickness of 20 µm.

Figure 4:
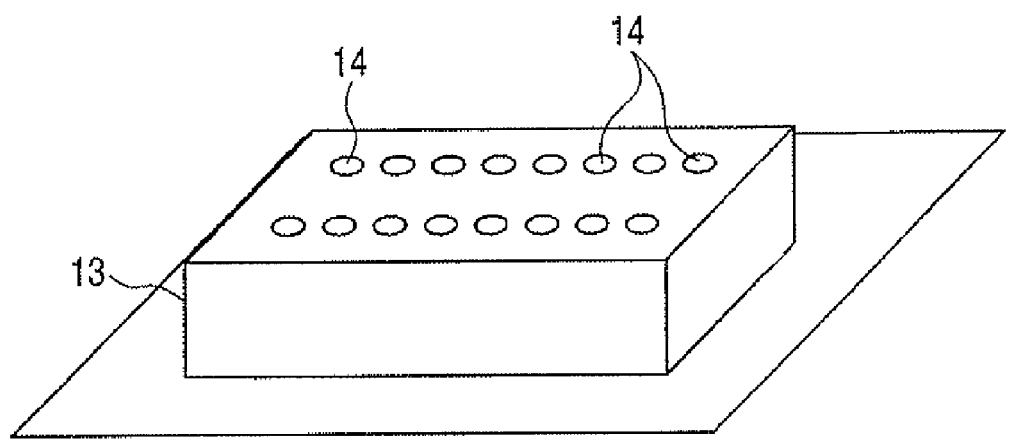
FIG. 4 is a perspective view of a cured product of an epoxy resin composition of each of Examples of the present invention used for Evaluation 2.

Then, the resin composition layer was patterned (a pattern in which two lines of a hole pattern having a diameter of 15 µm was formed at a 40 µm pitch on a pattern of 30 mm in length and 0.6 mm in width) by using a mask aligner MPA600 (trade name) manufactured by Canon Inc. The exposure was changed within a range of 300 to 1,000 $mJ/cm^2$, and a plurality of resin composition layers subjected to different exposure but not developed were obtained for the epoxy resin composition of each of Examples. Then, the resin composition layer was heated on a hot plate, developed, and cured through heat treatment, to thereby obtain a pattern as shown in FIG. 4. Note that heating conditions and the like were arbitrarily adjusted.

As described above, a plurality of cured products 13 were obtained for each of Examples.

Observation of each of the cured products on a surface having a hole pattern 14 formed revealed that a favorable pattern with a sharp edge part was obtained. Cracks on an opened surface of the hole were visually observed. Evaluation criteria are as follows.

A: No noticeable cracks were observed in any cured products.

B: Noticeable cracks were observed in part of cured products.

Table 1 shows the results.

TABLE 1

Evaluation of epoxy resin composition

|  | Observation of cracks |
|---|---|
| Example 1 | B |
| Example 2 | B |
| Example 3 | B |
| Example 4 | B |
| Example 5 | A |
| Example 6 | A |
| Example 7 | A |
| Example 8 | A |

In view of suppressing cracks, the results indicated that the epoxy resin composition of each of Examples 5 to 8, that is, the epoxy resin composition satisfying [epoxy resin (B) (parts by weight)/epoxy resin (A) (parts by weight)]≧1 was particularly preferred.

The evaluation described above revealed that the epoxy resin composition of the present invention had sufficient polymerization reactivity for forming a fine pattern and can be applied to an ink jet recording head.

Next, evaluation was conducted on water absorption property of a passage wall forming member of an ink jet recording head produced by using the epoxy resin composition of the present invention.

(Evaluation 4)

First, an ink jet recording head to which the present invention can be applied will be described.

Figure 6:
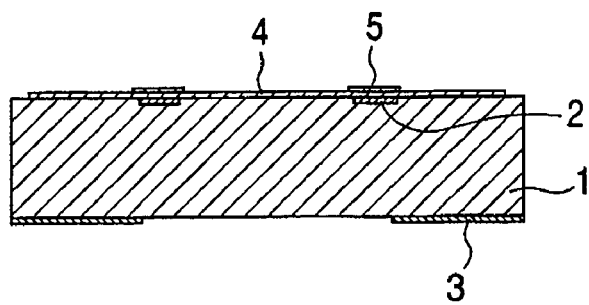
FIG. 6 is a schematic sectional diagram showing an example of a method of producing an ink jet recording head of each of Examples of the present invention.

FIG. 6 is a schematic diagram showing an ink jet recording head according to an embodiment of the present invention.

The ink jet recording head according to the embodiment of the present invention includes a substrate 1 having two lines of energy generating elements 2 to be used for discharging ink formed at a predetermined pitch. The substrate 1 has a supply port 10 for supplying ink opened between the energy generating elements. On the substrate 1, an ink discharge port 9 opened toward each of the energy generating elements and an ink passage connected from the ink supply port 10 to each of the ink discharge port 9 are formed with an ink passage wall forming member.

The ink jet recording head is arranged such that a surface having the ink discharge port 10 formed faces a recording surface of a recording medium. In the ink jet recording head, a pressure generated by the energy generating element 2 is applied to ink filled in the ink passage through the ink supply port 10 to discharge ink droplets from the ink discharge port 9, and the ink droplets are attached to the recording medium for recording.

The ink jet recording head may be loaded in device such as a printer, a copying machine, a facsimile, a word processor having a printer part, and an industrial recording device combined with various processing devices.

Figure 5:
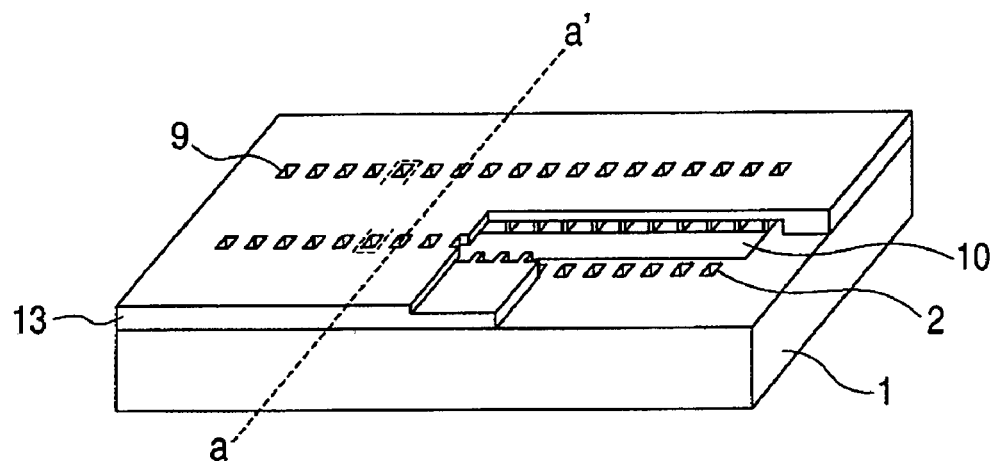
FIG. 5 is a schematic diagram of an ink jet recording head according to an embodiment of the present invention.

Next, a method of producing the ink jet recording head according to the embodiment of the present invention will be described with reference to the figures. Note that FIGS. 6, 7, 8, 9, 10 and 11 to be used in the following description show sectional views of FIG. 5 at the position a-a'.

First, on the substrate 1 provided with a mask 3 for forming an ink supply port on a back surface, an electric-heat exchange element as the energy generating element 2 for discharging ink was arranged, and protective layers 4 and 5 were formed (FIG. 6). Note that the energy generating element 2 is connected with a control signal input electrode (not shown) for activating the element.

Figure 7:
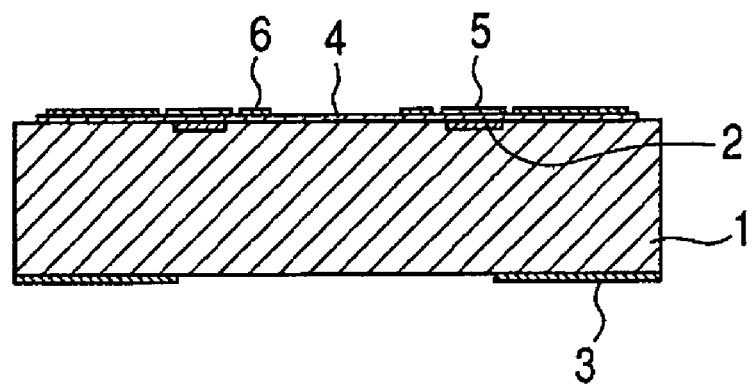
FIG. 7 is a schematic sectional diagram showing an example of the method of producing an ink jet recording head of each of Examples of the present invention.

Then, an adhesive layer 6 was formed on the substrate 1 (FIG. 7).

Figure 8:
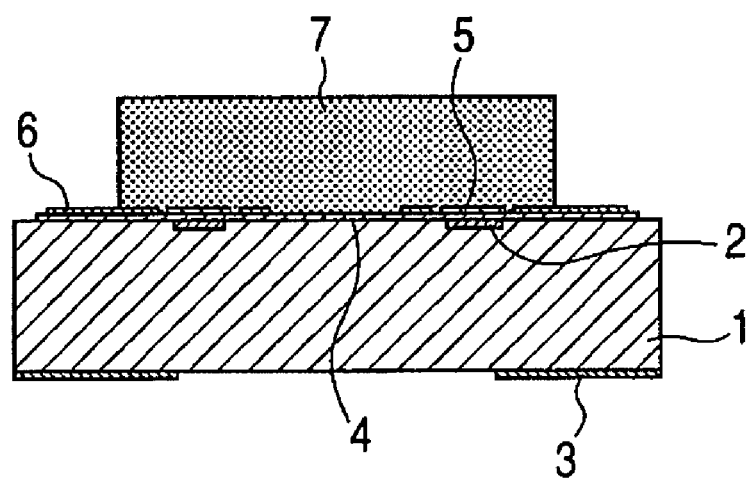
FIG. 8 is a schematic sectional diagram showing an example of the method of producing an ink jet recording head of each of Examples of the present invention.

Then, a solution containing a positive photosensitive resin dissolved in a solvent was applied to the substrate 1, to thereby form a layer having a thickness of 12 µm. Exposure was conducted by using UX3000 manufactured by Ushio Inc., and development was conducted by using methyl isobutyl ketone, to thereby form an ink passage pattern 7 (FIG. 8).

Figure 9:
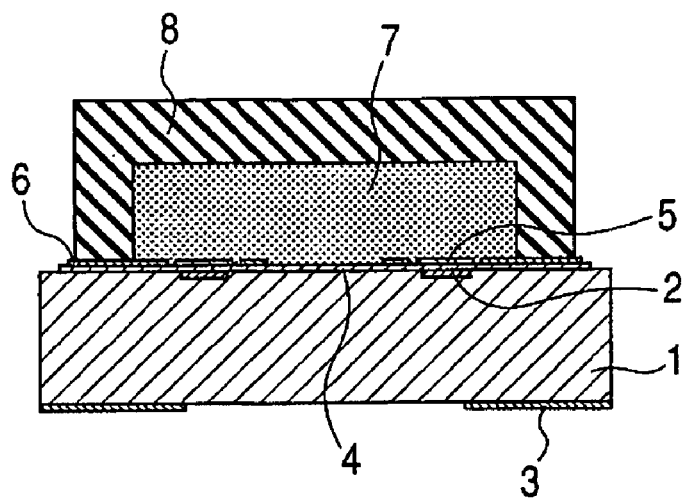
FIG. 9 is a schematic sectional diagram showing an example of the method of producing an ink jet recording head of each of Examples of the present invention.

Next, the epoxy resin composition of each of Examples of the present invention was dissolved in methyl isobutyl ketone, and a coated resin layer 8 was formed on the ink passage pattern 7. The whole was prebaked at 90° C. for 4 min (FIG. 9).

Figure 10:
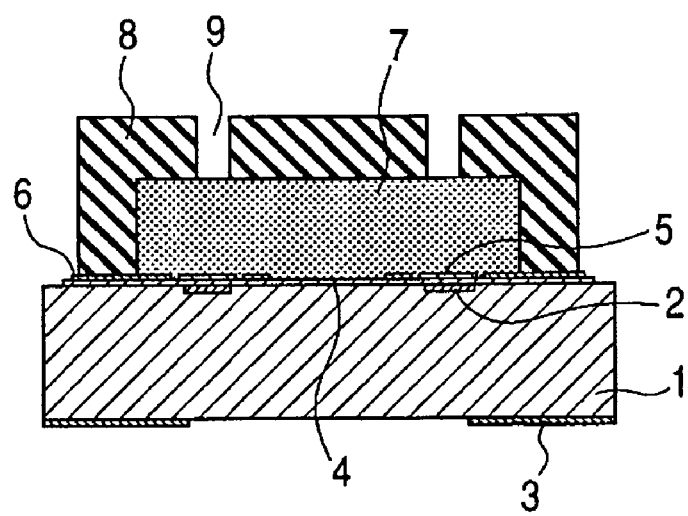
FIG. 10 is a schematic sectional diagram showing an example of the method of producing an ink jet recording head of each of Examples of the present invention.

Next, exposure was conducted by using a liquid discharge port mask pattern by using a mask aligner MPA-600 Super manufactured by Canon Inc., and development was conducted by using methyl isobutyl ketone, to thereby form a very small discharge port 9 (ink discharge port: diameter of 8 µm) (FIG. 10).

Figure 11:
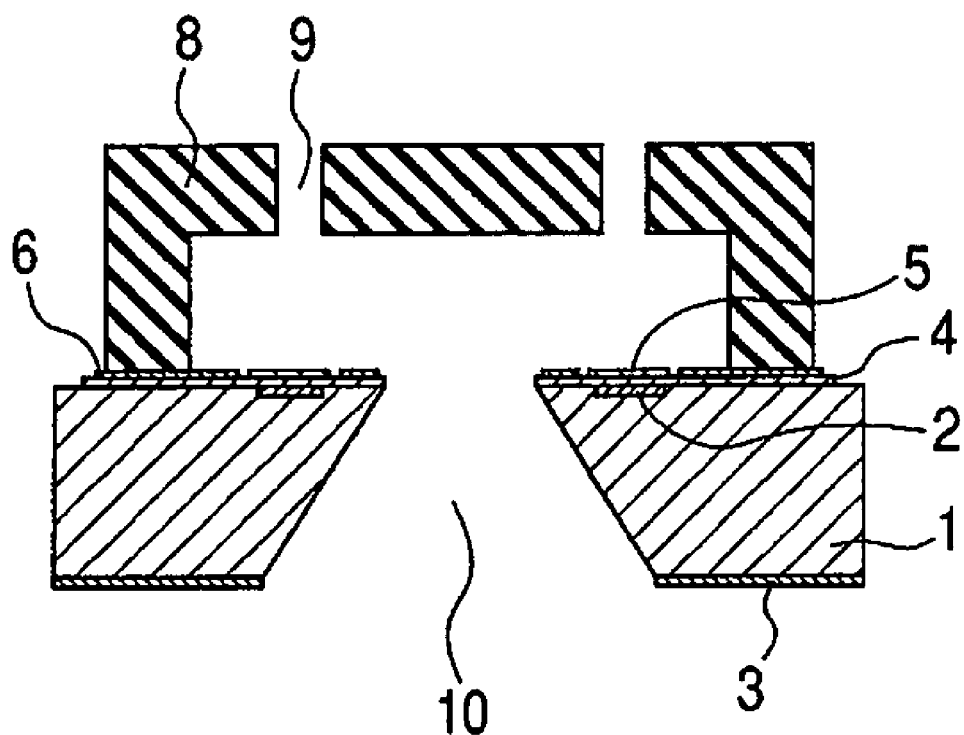
FIG. 11 is a schematic sectional diagram showing an example of the method of producing an ink jet recording head of each of Examples of the present invention.

Then, the back surface of the substrate 1 was etched by Si anisotropic etching to form the ink supply port 10 and remove the protective layers and the ink passage pattern 7 on the ink supply port 10. For complete curing of the resin composition forming the coated resin layer 8 serving as an ink passage wall, a passage wall forming member was formed under heating at 200° C. for 1 hour, to thereby obtain an ink jet recording head (FIG. 11).

The ink jet recording head employing the passage wall forming member formed of the cured product of the epoxy resin composition of each of Examples 1 to 8 of the present invention was produced by the production method described above.

Next, the produced ink jet recording head was loaded in a recording device, and 10,000-page test print was conducted with high alkali ink by using ink BCI-6C available from Canon Inc. As a result, no image was distorted.

The diameter of the discharge port after the test print was compared with that immediately after production, and a reduction ratio was measured. The reduction ratio of the ink jet recording head according to each of Examples 1 to 8 of the present invention was 5% at maximum. The results confirmed that the ink jet recording head according to each of Examples 1 to 8 of the present invention maintained ink resistant property comparable to that of the conventionally known ink jet recording head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-363453, filed Dec. 16, 2005, which is hereby incorporated by reference herein in its entirety.

What is claimed is:

1. An epoxy resin composition for a photosensitive resin composition for forming a pattern, the epoxy resin composition comprising:
    an epoxy resin (A) represented by Formula (1);
    an epoxy resin (B) having an epoxy equivalent of 220 or less and having twice or more epoxy groups in a molecule than epoxy groups of the epoxy resin (A); and
    a photocationic polymerization initiator (C), wherein:
    the epoxy resins (A) and (B) constitute main components; and
    a weight of the epoxy resin (A) is 40% or more and a weight of the epoxy resin (B) is 30% or more with respect to a total weight of the epoxy resins (A) and (B):

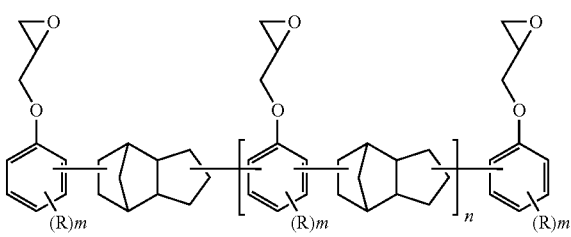

Formula (1)

where: R represents a hydrogen atom, a methyl group, an ethyl group, a propyl group, or a t-butyl group; n represents an integer of 0 or more and 4 or less; and m represents an integer of 1 or more and 3 or less, wherein the epoxy resin (B) comprises an epoxy resin represented by Formula (2) described below:

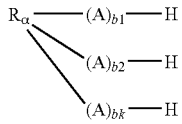

Formula (2)

where: $R_\alpha$ represents a k-valent organic compound residue; b1, b2, bk, and so on are each an integer of 1 or more and 100 or less, and a sum of b1, b2, bk, and so on is no more than 100; k represents an integer of 1 or more and 100 or less; A represents an oxycyclohexane skeleton represented by Formula (3) or (4) described below: where, X represents an epoxy group,

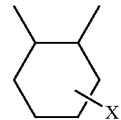

Formula (3)

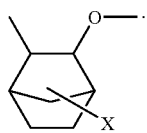

Formula (4)

2. A resin cured product, which is obtained by curing the epoxy resin composition according to claim 1 through photocationic polymerization.

3. An epoxy resin composition according to claim 1, wherein the cationic polymerization initiator is an aromatic sulfonium salt or an aromatic iodonium salt.

4. An epoxy resin composition according to claim 3, wherein the aromatic sulfonium salt is a compound represented by Formula (6) described below.

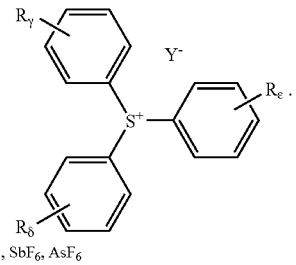

Formula (6)

$Y = PF_3, SbF_6, AsF_6$
$R_\gamma, R_\delta, R_\epsilon$: Hydrocarbon Groups

5. A liquid discharge head, comprising:
    an energy generating element for generating energy to be used for discharge of a liquid;
    a discharge port for discharging the liquid; and
    a passage for supplying the liquid to the discharge port, wherein the discharge port and the passage are each formed of an epoxy resin composition according to claim 1.

6. An epoxy resin composition according to claim 1, wherein the weight of the epoxy resin (A) is from 40% to 50%.

7. An epoxy resin composition according to claim 1, wherein the epoxy resins (A) and (B) are account for 50 wt % or more of a total weight of the composition.

8. An epoxy resin composition for a photosensitive resin composition for forming a pattern, the epoxy resin composition comprising:
   an epoxy resin (A) represented by Formula (1);
   an epoxy resin (B) having an epoxy equivalent of 220 or less and having twice or more epoxy groups in a molecule than epoxy groups of the epoxy resin (A); and
   a photocationic polymerization initiator (C), wherein:
   the epoxy resins (A) and (B) constitute main components; and
   a weight of the epoxy resin (A) is 40% or more and a weight of the epoxy resin (B) is 30% or more with respect to a total weight of the epoxy resins (A) and (B): Formula (1)

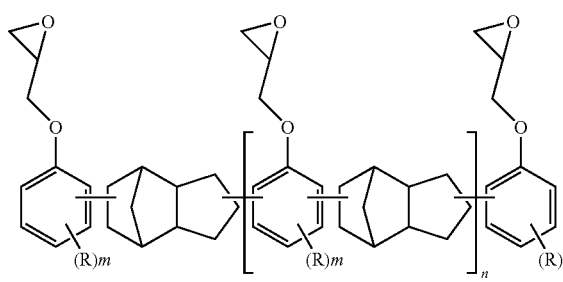

where: R represents a hydrogen atom, a methyl group, an ethyl group, a propyl group, or a t-butyl group; n represents an integer of 0 or more and 4 or less; and m represents an integer of 1 or more and 3 or less,
   wherein the epoxy resin (B) comprises an epoxy resin represented by Formula (5) described below:

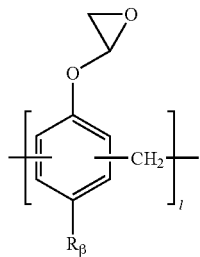

Formula (5)

where: $R_\beta$ represents a hydrocarbon compound having an epoxy group; and l represents a natural number.

9. A resin cured product, which is obtained by curing the epoxy resin composition according to claim 8 through photocationic polymerization.

10. An epoxy resin composition according to claim 8, wherein the cationic polymerization initiator is an aromatic sulfonium salt or an aromatic iodonium salt.

11. An epoxy resin composition according to claim 10, wherein the aromatic sulfonium salt is a compound represented by Formula (6) described below

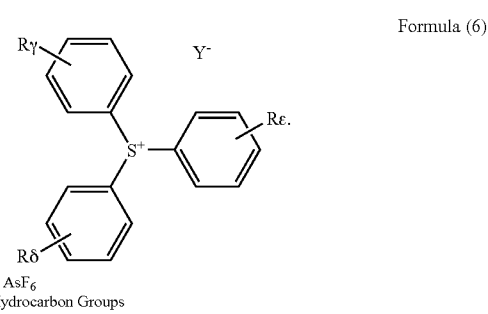

Formula (6)

$Y=PF_3, SbF_6, AsF_6$
$R_\gamma, R_\delta, R_\epsilon$: Hydrocarbon Groups

12. A liquid discharge head, comprising:
   an energy generating element for generating energy to be used for discharge of a liquid;
   a discharge port for discharging the liquid; and
   a passage for supplying the liquid to the discharge port,
   wherein the discharge port and the passage are each formed of an epoxy resin composition according to claim 8.

13. An epoxy resin composition according to claim 8, wherein the weight of the epoxy resin (A) is from 40% to 50%.

14. An epoxy resin composition according to claim 8, wherein the epoxy resins (A) and (B) are account for 50 wt % or more of a total weight of the composition.

* * * * *